(12) United States Patent
Choquette et al.

(10) Patent No.: US 8,132,825 B1
(45) Date of Patent: Mar. 13, 2012

(54) FIFTH WHEEL HITCH

(75) Inventors: Paul Choquette, Sergeant Bluff, IA (US); Leslie Roeber, Emerson, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 19 days.

(21) Appl. No.: 12/807,872

(22) Filed: Sep. 16, 2010

(51) Int. Cl.
*B62D 53/08* (2006.01)

(52) U.S. Cl. ......... 280/434; 280/433; 280/435; 280/436

(58) Field of Classification Search ................. 280/433, 280/434, 435, 436, 437, 438.1, 439, 440, 280/441
See application file for complete search history.

(56) References Cited

U.S. PATENT DOCUMENTS

| | | | | |
|---|---|---|---|---|
| 2,005,722 A | * | 6/1935 | Ketel et al. | 280/435 |
| 2,656,706 A | * | 10/1953 | Lucas et al. | 70/232 |
| 2,772,895 A | | 12/1956 | Steeves | |
| 2,943,878 A | * | 7/1960 | Rigaud | 292/44 |
| 3,251,610 A | | 5/1966 | Chosy | |
| 3,352,571 A | | 11/1967 | Nelson | |
| 3,525,538 A | | 8/1970 | Fujioka et al. | |
| 3,534,982 A | | 10/1970 | Mathers et al. | |
| 3,539,202 A | * | 11/1970 | Nelson | 280/434 |
| 3,870,342 A | * | 3/1975 | Baxter et al. | 280/433 |
| 4,592,566 A | | 6/1986 | Inoue et al. | |
| 4,721,323 A | | 1/1988 | Czuk et al. | |
| 6,095,544 A | * | 8/2000 | Flater | 280/434 |
| 6,179,316 B1 | * | 1/2001 | Sibley, Jr. | 280/434 |
| 6,467,793 B2 | | 10/2002 | Putnam | |
| 6,908,093 B1 | | 6/2005 | Putnam | |
| 6,935,650 B2 | | 8/2005 | Grinde et al. | |
| 7,152,869 B2 | | 12/2006 | Dupay et al. | |
| 7,384,056 B2 | | 6/2008 | Anderson | |
| 7,475,899 B2 | | 1/2009 | Crawley | |
| 7,537,235 B2 | * | 5/2009 | Flater et al. | 280/433 |
| 7,543,837 B2 | | 6/2009 | Crawley | |
| 7,735,849 B1 | | 6/2010 | Mann | |
| 7,770,910 B1 | * | 8/2010 | Shirk, Jr. | 280/433 |
| 2003/0015855 A1 | * | 1/2003 | McCoy et al. | 280/433 |
| 2007/0102897 A1 | * | 5/2007 | Hoopes et al. | 280/433 |

* cited by examiner

*Primary Examiner* — Tony H. Winner
*Assistant Examiner* — Marc Scharich
(74) *Attorney, Agent, or Firm* — Donald R. Schoonover

(57) ABSTRACT

A fifth wheel hitch apparatus for connecting a kingpin to a towing vehicle includes a mounting mechanism having plate and skirt portions with an opening for ingress and egress of the kingpin, and a clamping mechanism having opposing first and second clamp elements. A first resilient device biases first and second lever arms of the respective first and second clamp elements to displace the first and second clamp elements into an opened configuration. Direct contact of the kingpin with the first and second clamp elements pivotally and positively displaces the first and second clamp elements from the opened configuration to a closed configuration to cooperatively capture the kingpin therebetween. A biased locking mechanism is releasably retained in an unlocked configuration and locks the first and second clamp elements in the closed configuration. In a modified embodiment, the first and second clamp elements are connected together to also pivot relative to each other about a common third pivot axis.

13 Claims, 3 Drawing Sheets

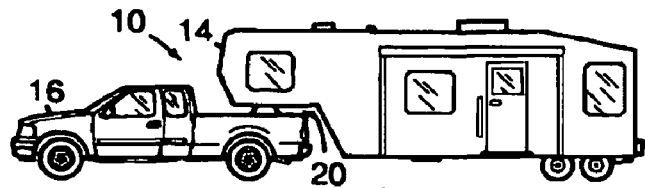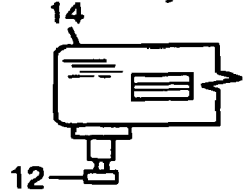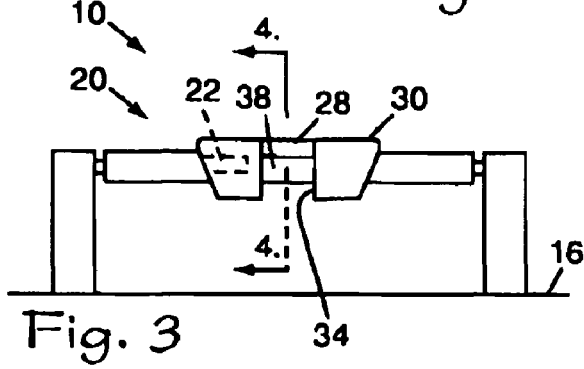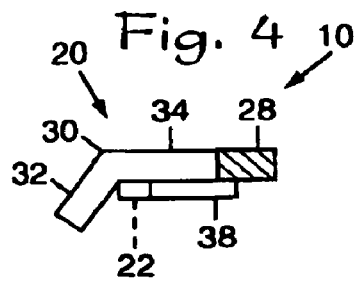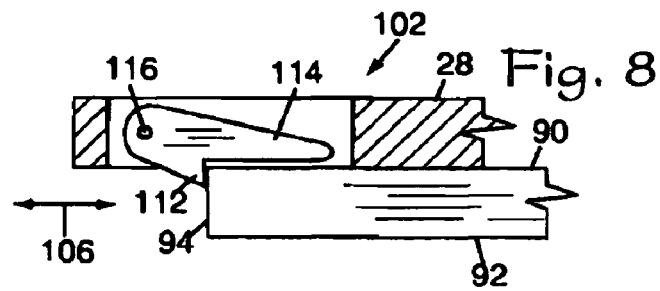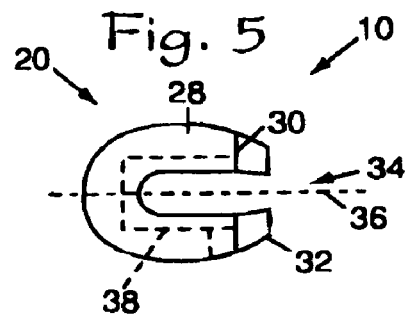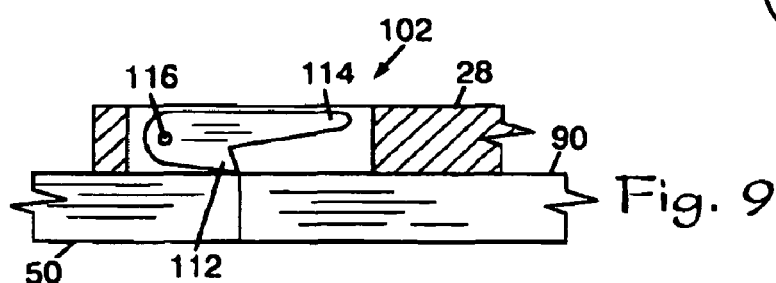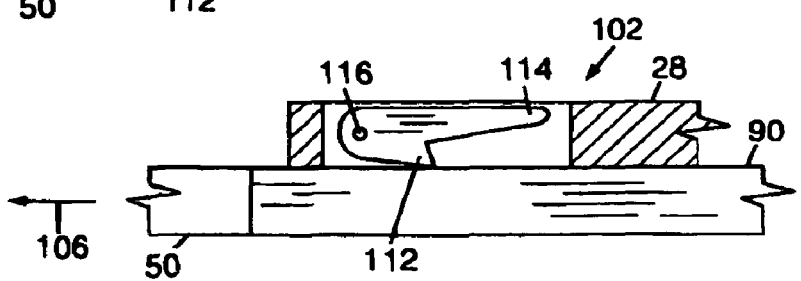

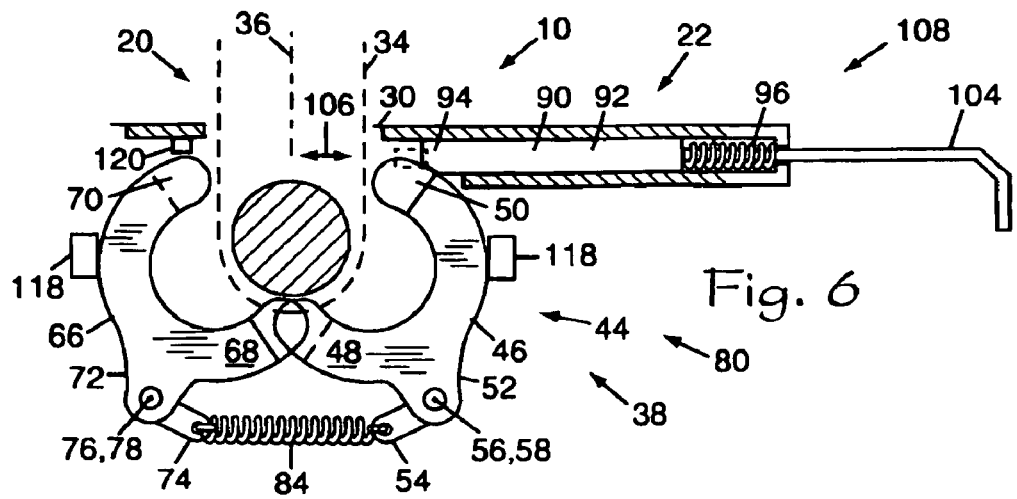
Fig. 6
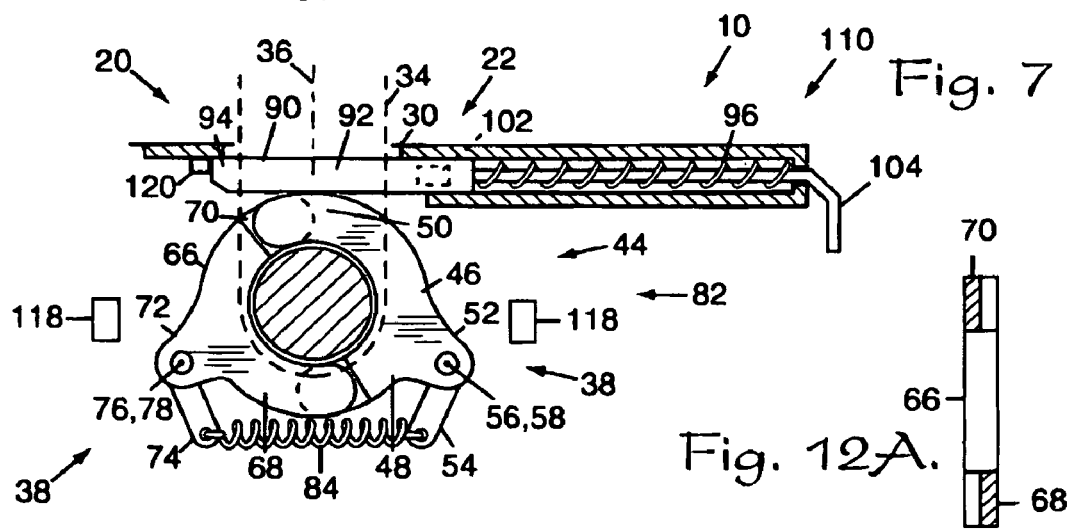
Fig. 7
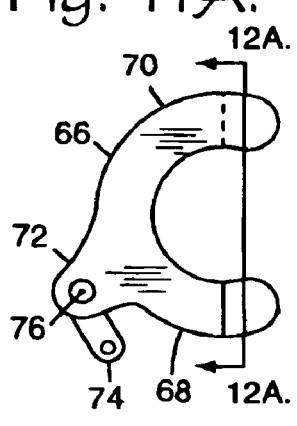
Fig. 11A.
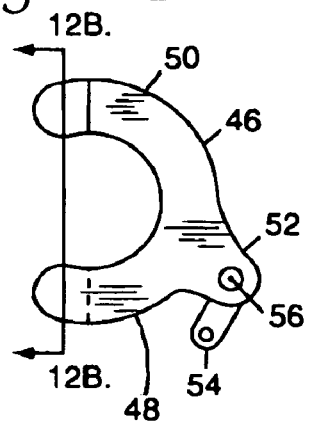
Fig. 11B.
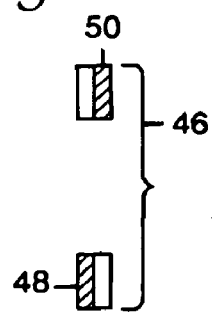
Fig. 12A.
Fig. 12B.

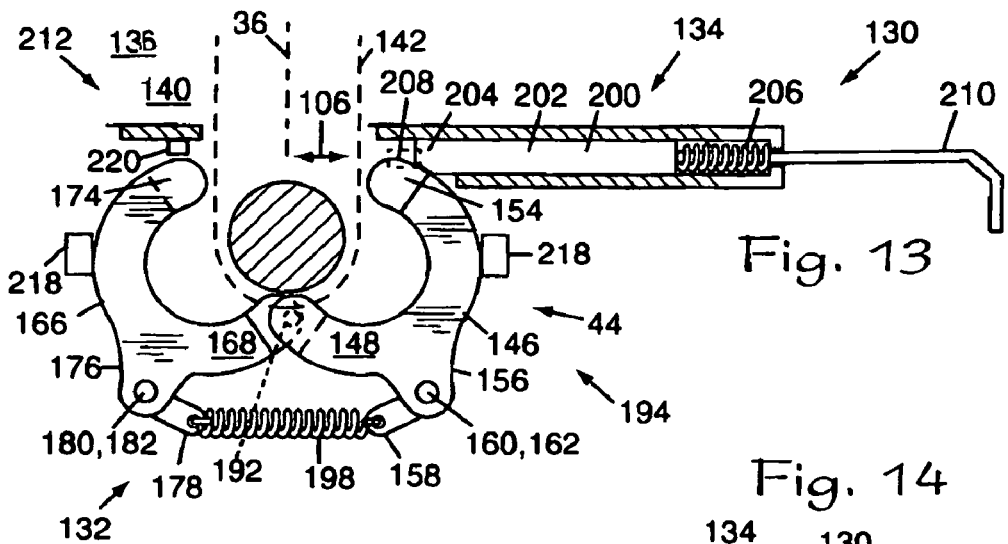
Fig. 13
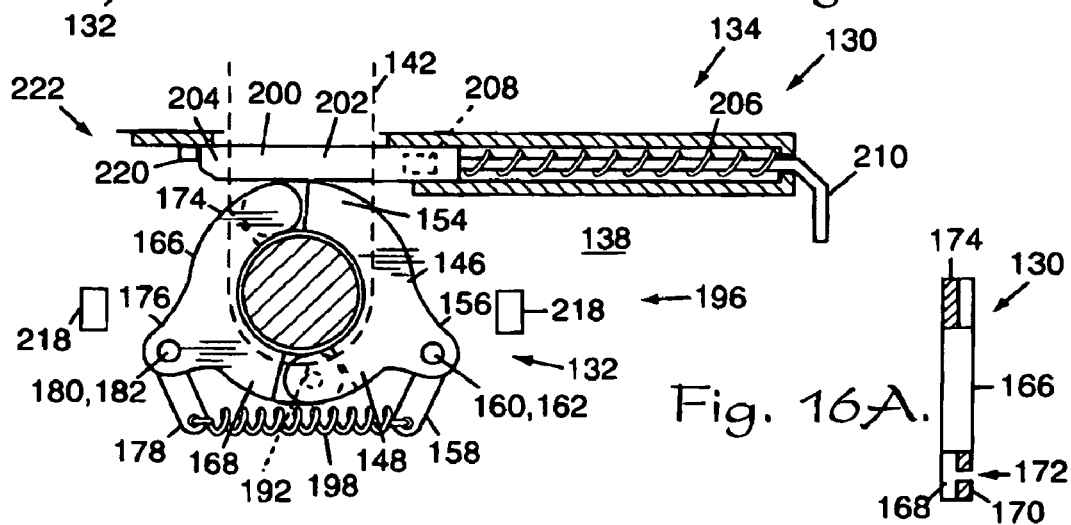
Fig. 14
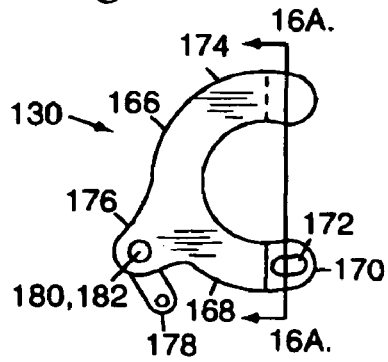
Fig. 15A.
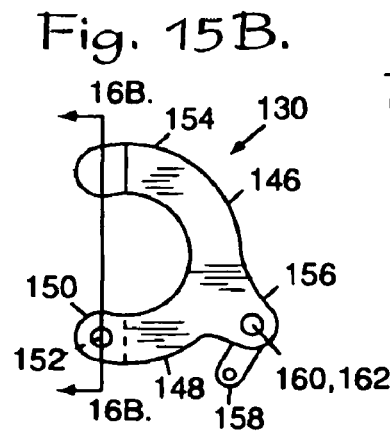
Fig. 15B.
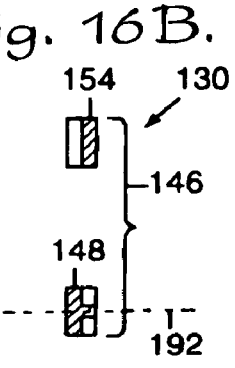
Fig. 16A.
Fig. 16B.

FIFTH WHEEL HITCH

BACKGROUND OF THE INVENTION

1. Field of the Invention

The present invention relates to towing accessories and, more particularly without limitation, to hitches for connecting a fifth wheel or gooseneck trailer to a towing vehicle.

2. Description of the Related Art

A fifth wheel hitch is used to connect a fifth wheel trailer or a gooseneck trailer to a towing vehicle. Although there are variations in which such a trailer is connected to the towing vehicle, typically the trailer includes a cylindrically-shaped kingpin extending vertically-downwardly from a horizontally-oriented trailer plate, with the kingpin having a smaller-diameter portion and larger-diameter portions.

Fifth wheel hitches generally include a horizontally-oriented hitch plate. The trailer plate and the hitch plate jointly provide abutting bearing surfaces for operatively supporting the front end of the trailer when the trailer is connected to the fifth wheel hitch of the towing vehicle.

Fifth wheel hitches also generally include a skirt extending rearwardly and downwardly from the hitch plate. An access opening, which is centrally-located in the hitch plate, extends rearwardly to a rear edge of the plate and continues along the skirt. The skirt and access opening assist a user to properly align and guide the kingpin and the trailer plate as the trailer is being connected to the towing vehicle.

Fifth wheel hitches include a kingpin receiver which generally includes a pair of opposing jaws for lockingly capturing the smaller-diameter portion of the kingpin so the towing vehicle and the trailer can operatively pivot relative to each other about the kingpin to accommodate yaw as the trailer is being towed around a corner for example.

The fifth wheel hitch may include a gimble mounting to accommodate instantaneous variations in pitch and/or roll attitudes between the towing vehicle and the trailer. Prior art fifth wheel hitches generally employ various arrangements for capturing the kingpin between the jaws, employ various arrangements for locking the kingpin in the jaws, and employ various arrangements for unlocking the jaws from the kingpin. The various arrangements generally include a number of moving parts and sometimes several linkages, which are subject to excessive wear, substantial maintenance and ultimate failure arising from the adverse conditions to which the components of fifth wheel hitches are normally exposed.

Applicants are unaware of any prior art fifth wheel hitches wherein a kingpin directly contacts the jaws of a fifth wheel hitch to thereby directly and positively capture the kingpin between the jaws, to substantially reduce the number of moving parts of the hitch, and to eliminate the need for linkages for closing, locking and/or releasing the jaws of the hitch.

What is needed is a fifth wheel hitch wherein the kingpin of a trailer being connected to the fifth wheel hitch directly contacts the jaws causing them to thereby directly and positively capture a kingpin therebetween.

What is also needed is a fifth wheel hitch wherein the number of moving parts of the hitch is substantially reduced.

What is further needed is a fifth wheel hitch wherein the need for linkages for closing, locking and/or releasing the jaws is eliminated.

What is yet further needed is a fifth wheel hitch having a relatively simple structure and straightforward assembly, and is relatively inexpensive to manufacture.

For many prior art fifth wheel hitches, two persons are generally needed to connect the trailer to the towing vehicle, one person to back the towing vehicle to properly dispose the kingpin in the fifth wheel hitch and the other person to lock the jaws about the kingpin or, when disconnecting the trailer from the towing vehicle, one person to release the jaws from the kingpin and the other to drive the towing vehicle away from the trailer. Many times, a user does not have the benefit of an assistant and must work alone.

What is needed is a fifth wheel hitch wherein the jaws automatically capture and lock the kingpin therein.

What is also needed is a fifth wheel hitch wherein a user working alone can first unlock the jaws and then drive the towing vehicle away from the trailer.

SUMMARY OF THE INVENTION

The improvements of the present invention for a fifth wheel hitch apparatus for connecting a kingpin of a fifth wheel or gooseneck trailer to a towing vehicle include a mounting mechanism secured to the towing vehicle and a locking mechanism.

The mounting mechanism includes a generally horizontally-oriented plate portion having a rear edge, a skirt portion extending rearwardly and downwardly from the rear edge of the plate portion, a centrally-spaced opening through the plate portion wherein the opening extends rearwardly to and through the skirt portion to provide ingress and egress access for the kingpin of the trailer, and a clamping mechanism.

The clamping mechanism includes a first clamp element having a forward end, a rearward end, and a first lever arm spaced between the forward and rearward ends of the first clamp element and having a distal end, wherein the first clamp element is spaced below and pivotally mounted to the plate portion about a first axle to pivot about a vertically-oriented first pivot axis.

The clamping mechanism also includes a second clamp element having a forward end, a rearward end, and a second lever arm spaced between the forward and rearward ends of the second clamp element and having a distal end, wherein the second clamp element is spaced below and pivotally mounted to the plate portion about a second axle to pivot about a vertically-oriented second pivot axis. The first and second clamp elements are structured and configured to be pivotally displaceable about the first and second pivot axes to cooperatively form an opened configuration wherein the rearward ends of the first and second clamp elements are spaced apart from each other in order to receive a kingpin of a fifth wheel or gooseneck trailer therebetween, and to cooperatively form a closed configuration wherein the kingpin is captured between the first and second clamp elements.

The clamping mechanism further includes a first resilient device connecting the distal ends of the first and second lever arms wherein the rearward ends of the first and second clamp elements are normally biased away from each other to the opened configuration.

The locking mechanism includes a tumbler having a shank with a distal end, an unlocked configuration wherein the tumbler does not interfere with pivoting of the first and second clamp elements, a locked configuration wherein the tumbler does prevent pivoting of the first and second clamp elements when the first and second clamp elements have assumed the closed configuration, a second resilient device which normally and transversely biases the tumbler from the unlocked configuration to the locked configuration when the first and second clamp elements have assumed the closed configuration, a handle connected to the tumbler enabling a user to selectively place the tumbler in the unlocked configuration, and a latch structured to releasably retain the tumbler in the unlocked configuration.

The fifth wheel hitch apparatus is structured and configured wherein as the kingpin bears directly against the forward ends of the first and second clamp elements causing them to pivot about the first and second pivot axes, the first clamp element causes the latch to release the tumbler from the unlocked configuration and, as the kingpin continues to bear against the forward ends of the first and second clamp elements, the first and second clamp elements are positively and directly pivoted about the first and second pivot axes from the opened configuration to the closed configuration and the second resilient device transversely biases the tumbler from the unlocked configuration to the locked configuration whereat the shank of the tumbler abuttingly engages the rearward ends of the first and second clamp elements thereby securely capturing and locking the kingpin between the first and second clamp elements in the closed configuration.

The improvements of the present invention include a modified embodiment wherein the distal end of the first clamp element includes a peg and the distal end of the second clamp element includes a slot for slidably receiving the peg therein wherein the first and second clamp elements pivot relative to each other about a common third pivot axis. The first and second clamp elements are structured and configured to be pivotally displaceable about the first, second and third pivot axes to cooperatively form an opened configuration wherein the rearward ends of the first and second clamp elements are spaced apart from each other, and to cooperatively form a closed configuration wherein the kingpin is captured between the first and second clamp elements.

PRINCIPAL OBJECTS AND ADVANTAGES OF THE INVENTION

The principal objects and advantages of the present invention include: providing a fifth wheel hitch wherein the kingpin of a trailer being connected to a fifth wheel hitch directly contacts the jaws causing them to directly and positively capture a kingpin therebetween; providing such a fifth wheel hitch wherein the number of moving parts of the hitch is substantially reduced; providing such a fifth wheel hitch wherein the need for linkages for closing, locking and/or releasing the jaws is eliminated; providing such a fifth wheel hitch wherein the jaws automatically capture and lock the kingpin therein; providing such a fifth wheel hitch wherein a user working alone can unlock jaws thereof and then drive the towing vehicle away from the trailer; providing such a fifth wheel hitch having a relatively simple structure, straightforward assembly, and being relatively inexpensive to manufacture; and generally providing such a fifth wheel hitch that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

BRIEF DESCRIPTION OF THE DRAWING FIGURES

FIG. 1 shows a side elevational view of a fifth wheel hitch connecting a fifth wheel trailer to a towing vehicle in accordance with the present invention.

FIG. 2 shows a prior art kingpin of a fifth wheel trailer.

FIG. 3 is an enlarged and schematic representation of a rear elevational view of a mounting mechanism of the fifth wheel hitch of the present invention.

FIG. 4 is a partially cross-sectional view of a plate portion and skirt portion of the mounting mechanism of the fifth wheel hitch, taken along line 4-4 of FIG. 3.

FIG. 5 is a top plan view of the plate portion and skirt portion of the mounting mechanism of the fifth wheel hitch.

FIG. 6 is a further enlarged and partially cross-sectional and schematic, top plan view of the mounting mechanism wherein a plate portion thereof has been removed for purposes of clarity, showing first and second clamp elements of the mounting mechanism in an opened configuration and a locking mechanism in an unlocked configuration.

FIG. 7 is a view similar to FIG. 6 but showing the first and second clamp elements of the mounting mechanism in a closed configuration and the locking mechanism in a locked configuration.

FIG. 8 is a still further enlarged and partially cross-sectional schematic and side elevational view of an exemplary locking mechanism showing a trigger portion thereof extending into a path of, and releasably retaining, a tumbler of the locking mechanism.

FIG. 9 is a view similar to FIG. 8 but showing the trigger portion displaced from the path of the tumbler by a rearward end of the first clamp element.

FIG. 10 is a view similar to FIG. 9 but showing the tumbler following the rearward end of the first clamp element as the first clamp element is being displaced from the opened configuration to the closed configuration.

FIGS. 11A and 11B are schematic top plan views of the first and second clamp elements of FIG. 6 showing that the second clamp element is identical to the first clamp element if the first clamp element were rotated 180° about a fore-to-aft axis of a towing vehicle.

FIGS. 12A and 12B are schematic cross-sectional views of the first and second clamp elements taken along lines 12A-12A and 12B-12B of FIGS. 11A and 11B, respectively, in accordance with the present invention.

FIG. 13 is a partially cross-sectional and schematic top plan view of a mounting mechanism of a modified embodiment of the fifth wheel hitch wherein a plate portion thereof has been removed for purposes of clarity, showing first and second clamp elements of the mounting mechanism in an opened configuration and a locking mechanism in an unlocked configuration, in accordance with the present invention.

FIG. 14 is a view similar to FIG. 13 but showing the first and second clamp elements of the mounting mechanism of the modified embodiment in a closed configuration and the locking mechanism in a locked configuration.

FIGS. 15A and 15B are schematic top plan views of the first and second clamp elements of the modified embodiment showing them in greater detail.

FIGS. 16A and 16B are schematic cross-sectional views of the first and second clamp elements of the modified embodiment and taken along lines 16A-16A and 16B-16B of FIGS. 15A and 15B, respectively, in accordance with the present invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a fifth wheel hitch apparatus 10 for connecting a kingpin 12 of a fifth wheel or gooseneck trailer 14 to a towing vehicle 16 in accordance with the present invention as shown in FIGS. 1 through 12B. The fifth wheel hitch apparatus 10 includes a mounting mechanism 20 secured to the towing vehicle 16, and a locking mechanism 22.

The mounting mechanism 20 includes a generally horizontally-oriented plate portion 28 having a rear edge 30, a skirt portion 32 extending rearwardly and downwardly from the rear edge 30 of the plate portion 28, and a centrally-spaced opening 34 through the plate portion 28 and extending rearwardly to and through the skirt portion 32 along a centerline 36, as shown in FIGS. 3-5, to provide ingress and egress access for the kingpin of the trailer. The mounting mechanism 20 also includes a clamping mechanism 38 mounted beneath the opening 34.

The clamping mechanism 38 includes a pair of opposing jaws 44, one of the opposing jaws 44 having a first clamp element 46 having a forward end 48, a rearward end 50, and a first lever arm 52 spaced between the forward and rearward ends 48, 50 of the first clamp element 46 and having a distal end 54. The first clamp element 46 is spaced below and pivotally mounted to the plate portion 28 about a first axle 56 to pivot about a vertically-oriented first pivot axis 58.

The clamping mechanism 38 also includes the other one of the opposing jaws 44 having a second clamp element 66 having a forward end 68, a rearward end 70, and a second lever arm 72 spaced between the forward and rearward ends 68, 70 of the second clamp element 66 and having a distal end 74. The second clamp element 66 is spaced below and pivotally mounted to the plate portion 28 about a second axle 76 to pivot about a vertically-oriented second pivot axis 78.

The first and second clamp elements 46, 66 are structured and configured to be pivotally displaceable about the first and second pivot axes 58, 78 to cooperatively form an opened configuration 80 wherein the rearward ends 50, 70 of the first and second clamp elements 46, 66 are spaced apart from each other in order to receive a kingpin of a fifth wheel or gooseneck trailer therebetween as shown in FIG. 6, and to cooperatively form a closed configuration 82 wherein the kingpin is captured between the first and second clamp elements 46, 66 as shown in FIG. 7.

The clamping mechanism 38 further includes a first resilient device 84 connecting the distal end 54 of the first lever arm 52 to the distal end 74 of the second lever arm 72 wherein the rearward ends 50, 70 of the first and second clamp elements 46, 66 are normally biased away from each other to the opened configuration 80.

The locking mechanism 22 includes a tumbler 90 having a shank 92 with a distal end 94, a second resilient device 96, a latch 102, and a handle 104. The tumbler 90 is spaced below and slidably mounted to the plate portion 28 wherein the tumbler 90 is transversely displaceable relative to the centerline 36 along a path 106 as shown in FIG. 6. The second resilient device 96 is structured and configured to normally bias the tumbler 90 from an unlocked configuration 108 as shown in FIG. 6 wherein the tumbler 90 does not prevent pivoting of the first and second clamp elements 46, 66 about the first and second pivot axes 58, 78, to a locked configuration 110 as shown in FIG. 7 wherein the tumbler 90 does prevent the first and second clamp elements 46, 66 from pivoting about the first and second pivot axes 58, 78 when the first and second clamp elements 46, 66 have assumed the closed configuration 82, as described herein.

The handle 104 is structured and configured to enable a user to selectively place the tumbler 90 in the unlocked configuration 108, and the latch 102 is structured and configured to releasably retain the tumbler 90 in the unlocked configuration 108. For example, the latch 102 may include a trigger portion 112 and a tail portion 114, the latch 102 being mounted in the plate portion 28 to pivot about a horizontally-oriented axle 116, as schematically shown in FIGS. 8-10. When the handle 104 is used to displace the tumbler 90 from the locked configuration 110 to the unlocked configuration 108 wherein the trigger portion 112 is disposed between the centerline 36 and the distal end 94 of the tumbler 90, the tail portion 114 gravitationally causes the trigger portion 112 to be displaced downwardly into the path 106 of the tumbler 90 thereby retaining the tumbler 90 in the unlocked configuration 108 as shown in FIG. 8.

Then, when the kingpin is withdrawn from the clamping mechanism 38 as the trailer is being disconnected from the towing vehicle, the first resilient device 84 biases the first and second clamp elements 46, 66 from the closed configuration 82 to the opened configuration 80 whereat the rearward end 50 of the first clamp element 46 bears against the trigger portion 112, elevating the trigger portion 112 out of the path 106 of the tumbler 90 as shown in FIG. 9. The force arising from the first resilient device 84 which is applied by the rearward end 50 against the tumbler 90 is greater than the force arising from the second resilient device 96 which is applied by the tumbler 90 against the rearward end 50. As a result, the tumbler 90 with the rearward end 50 of the first clamp element 46 bearing thereagainst is retained in the unlocked configuration 108.

First stop 118 is mounted to the plate portion 28 to establish the locations of the first and second clamp elements 46, 66 in the opened configuration 80. Similarly, second stop 120 establishes the location of the distal end 94 of the tumbler 90 in the locked configuration 110.

It should be noted that for purposes of economical manufacturing and assembly, the structure of the second clamp element 66 may be substantially identical to the structure of the first clamp element 46 as shown in FIGS. 11-12. Simply stated, the structure of the second clamp element 66 is equivalent to a 180°-rotation of the first clamp element 46 about the centerline 36.

In an application of the fifth wheel hitch apparatus 10, the rear end of a towing vehicle is spaced near the front end of a trailer with the kingpin aligned with the centerline 36. As the towing vehicle is backed toward the trailer, the kingpin passes through opening 34 of the plate and skirt portions 28, 32 and bears against the forward ends 48,68 of the first and second clamp elements 46, 66 causing them to pivot about the first and second pivot axes 58, 78, the first clamp element 46 having previously released the trigger portion 112 of the latch 102 allows the tumbler 90 to follow the first clamp element 46 and escape from the unlocked configuration 108 and, as the kingpin continues to bear against the forward ends 48, 68 of the first and second clamp elements 46, 66, the first and second clamp elements 46, 66 are directly and positively pivoted about the first and second pivot axes 58, 78 from the opened configuration 80 to the closed configuration 82 whereupon the second resilient device transversely biases the tumbler 90 to the locked configuration 110 whereat the shank 92 of the tumbler 90 abuttingly engages the rearward ends 50, 70 of the first and second clamp elements 46, 66 thereby securely capturing and locking the kingpin between the first and second clamp elements 46, 66 in the closed configuration 82.

It should be noted that the kingpin bearing directly against the forward ends 48, 68 and positively pivoting the first and second clamp elements 46, 66 to the closed configuration 82 eliminates the need for many of the linkages required by prior art fifth wheel hitches.

To disconnect the trailer from the towing vehicle, a pull on handle 104 counters the biasing action of the second resilient device 96 and displaces the tumbler 90 from abutting engagement with the rearward ends 50, 70 of the first and second clamp elements 46, 66 to the unlocked configuration 108 wherein the latch 102 automatically and releasably locks the tumbler 90. As the towing vehicle pulls away from the trailer, the kingpin correspondingly pulls away from abutting engagement with the forward ends 48, 68 of the first and second clamp elements 46, 66 thereby allowing the first resilient device 84 to pivotally displace the first and second clamp elements 46, 66 about the first and second pivot axes 58, 78 thereby returning the first and second clamp elements 46, 66 to the opened configuration 80. As the rearward end 50 of the first clamp element 46 bears against the distal end 94 of the tumbler 90 in the unlocked configuration 108, the latch 102 is caused to release retention of the tumbler 90 in the unlocked configuration 108, ready for a subsequent connection to a kingpin.

A modified embodiment 130 of the fifth wheel hitch apparatus is shown in FIGS. 13-16B. Descriptions for many of the elements and limitations of modified embodiment 130 are substantially identical to those hereinbefore described for embodiment 10 and, therefore, will not be reiterated here. The modified embodiment 130 includes a clamping mechanism 132, a locking mechanism 134, and a mounting mechanism 136 having a generally horizontally-oriented plate portion 138, a skirt portion 140 extending rearwardly and downwardly from the plate portion 138, and a centrally-spaced opening 142 through the plate and skirt portions 138, 140.

The clamping mechanism 132 includes a first clamp element 146 including a forward end 148 having a distal end 150 with a peg 152, a rearward end 154, and a first lever arm 156 spaced between the forward and rearward ends 148, 154 and having a distal end 158. The first clamp element 146 is spaced below and pivotally mounted to the plate portion about a first axle 160 to pivot about a vertically-oriented first pivot axis 162.

The clamping mechanism 132 also includes a second clamp element 166 including a forward end 168 having a distal end 170 with a slot 172, a rearward end 174, and a second lever arm 176 spaced between the forward and rearward ends 168, 174 and having a distal end 178. The second clamp element 166 is spaced below and pivotally mounted to the plate portion about a second axle 180 to pivot about a vertically-oriented second pivot axis 182.

The slot 172 is dimensioned and configured to slidably receive the peg 152 of the forward end 148 of the first clamp element 146 therein, wherein the rearward ends 154, 174 of the first and second clamp elements 146, 166 pivot relative to each other about a common third pivot axis 192. The first and second clamp elements 146, 166 are structured and configured to be pivotally displaceable about the first, second and third pivot axes 162, 182, 192 to cooperatively form an opened configuration 194 as shown in FIG. 13 wherein the first and second clamp elements 146, 166 are spaced apart from each other in order to receive the kingpin therebetween, and to cooperatively form a closed configuration 196 as shown in FIG. 14 wherein the first and second clamp elements 146, 166 capture the kingpin therebetween.

The clamping mechanism 132 also includes a first resilient device 198 connecting the distal end 158 of the first lever arm 156 to the distal end 178 of the second lever arm 176 wherein the rearward ends 154, 174 of the first and second clamp elements 146, 166 are normally biased away from each other to the opened configuration 194.

The locking mechanism 134 includes a tumbler 200 with a shank 202 and a distal end 204, a second resilient device 206, a latch 208, and a handle 210. The tumbler 200 is spaced below, and slidably mounted transversely to, the plate portion 138. The second resilient device 206 is structured and configured to normally and transversely bias the shank 202 of the tumbler 200 into abutting engagement with the rearward ends 154, 174 of the first and second clamp elements 146, 166 when the first and second clamp elements 146, 166 have assumed the closed configuration 196. The latch 208 is structured to releasably retain the tumbler 200 in an unlocked configuration 212. The handle 210 is structured and configured to enable a user to selectively place the tumbler 200 in the unlocked configuration 212.

First stop 218 is mounted to the plate portion 138 to establish the locations of the first and second clamp elements 146, 166 in the opened configuration 194. Similarly, second stop 220 establishes the location of the distal end 204 of the tumbler 200 in a locked configuration 222.

An application of the modified embodiment 130 is substantially similar to that hereinbefore described for embodiment 10.

It is to be understood that while certain forms of the present invention have been illustrated and described herein, it is not to be limited to the specific forms or arrangement of parts as described and shown.

What is claimed and desired to be covered by Letters Patent is as follows:

1. A fifth wheel hitch apparatus for connecting a kingpin of a fifth wheel or gooseneck trailer to a towing vehicle, comprising:
   (a) a mounting mechanism secured to the towing vehicle;
   (b) a clamping mechanism including:
      (1) a first clamp element having a forward end, a rearward end and a first lever arm spaced between the forward and rearward ends, the first lever arm having a distal end mounted to the mounting mechanism about a first axle to pivot about a first pivot axis,
      (2) a second clamp element having a forward end, a rearward end, and a second lever arm spaced between the forward and rearward ends, the second lever arm having a distal end mounted to the mounting mechanism about a second axle to pivot about a second pivot axis, the first and second clamp elements being pivotable about the first and second pivot axes to cooperatively form an opened configuration wherein the rearward ends of the first and second clamp elements are spaced apart from each other in order to receive the kingpin of the fifth wheel or gooseneck trailer therebetween, and to cooperatively form a closed configuration wherein the kingpin is captured between the first and second clamp elements, and
      (3) a first resilient device connecting the distal ends of the first and second lever arms wherein the rearward ends of the first and second clamp elements are normally biased away from each other to the opened configuration; and
   (c) a locking mechanism slidably and transversely mounted to the mounting mechanism, the locking mechanism including a tumbler having a shank with a distal end, the locking mechanism having an unlocked configuration wherein the tumbler does not interfere with pivoting of the first and second clamp elements about the first and second pivot axes, and a locked configuration wherein the tumbler does prevent pivoting of the first and second clamp elements about the first and second pivot axes when the first and second clamp elements have assumed the closed configuration, a second resilient device structured and configured to normally transversely bias the tumbler from the unlocked configuration to the locked configuration, a handle connected to the tumbler enabling a user to place the tumbler in the unlocked configuration, and a latch structured to releasably retain the tumbler in the unlocked configuration, wherein, when the locking mechanism is in the unlocked configuration, as the kingpin is being removed from the first and second clamp elements, the rearward end of the first clamp element bears against the distal end of the tumbler causing the latch to release retention of the tumbler such that the rearward end of the first clamp element retains the tumbler in the unlocked configuration instead of the latch;

(d) wherein as the trailer is being connected to the towing vehicle, the kingpin thereof bears directly against the forward ends of the first and second clamp elements thereby positively and pivotally displacing the first and second clamp elements about the first and second pivot axes causing the kingpin to be captured between the first and second clamp elements whereupon the tumbler is transversely biased wherein the shank thereof abuttingly engages the rearward ends of the first and second clamp elements thereby locking the first and second clamp elements in the closed configuration.

2. A fifth wheel hitch apparatus as described in claim 1, wherein the mounting mechanism includes:
   a generally horizontally-oriented plate portion having a rear edge;
   a skirt portion extending rearwardly and downwardly from the rear edge of the plate portion; and
   a centrally-spaced opening through the plate portion, the opening extending rearwardly to and through the skirt portion to provide ingress and egress access for the kingpin of the trailer.

3. A fifth wheel hitch apparatus as described in claim 1, wherein the first resilient device includes a tension spring.

4. A fifth wheel hitch apparatus as described in claim 1, wherein the second resilient device includes a compression spring.

5. A fifth wheel hitch apparatus as described in claim 1, wherein a shape of the second clamp element is identical to a shape of the first clamp element.

6. A fifth wheel hitch apparatus for connecting a kingpin of a fifth wheel or gooseneck trailer to a towing vehicle, comprising:
   (a) a mounting mechanism secured to the towing vehicle;
   (b) a first clamp element including a forward end having a distal end with a peg, a rearward end, and a first lever arm spaced between the forward and rearward ends of the first clamp element and mounted to the mounting mechanism about a first axle to pivot about a first pivot axis;
   (c) a second clamp element including a forward end having a distal end with a slot, and a rearward end, and a second lever arm spaced between the forward and rearward ends of the second clamp element and mounted to the mounting mechanism about a second axle to pivot about a second pivot axis, the slot being structured and configured to slidably receive the peg of the forward end of the first clamp element therein, wherein the first and second clamp elements pivot relative to each other about a common third pivot axis, and wherein the first and second clamp elements pivot about the first, second and third pivot axes to cooperatively form an opened configuration wherein the rearward ends of the first and second clamp elements are spaced apart from each other in order to receive the kingpin of the fifth wheel or gooseneck trailer therebetween, and to cooperatively form a closed configuration wherein the kingpin is captured between the first and second clamp elements; and
   (d) a locking mechanism slidably and transversely mounted to the mounting mechanism, the locking mechanism including a tumbler having a shank with a distal end, the locking mechanism having an unlocked configuration wherein the tumbler does not interfere with pivoting of the first and second clamp elements, and a locked configuration wherein the tumbler does prevent pivoting of the first and second clamp elements when the first and second clamp elements have assumed the closed configuration;
   (e) wherein as the trailer is being connected to the towing vehicle, the kingpin bears directly against the forward ends of the first and second clamp elements thereby positively and pivotally displacing the first and second clamp elements about the first, second and third pivot axes causing the kingpin to be captured between the first and second clamp elements in the closed configuration.

7. A fifth wheel hitch apparatus as described in claim 6, further comprising:
   the first lever arm having a distal end;
   the second lever arm having a distal end; and
   a first resilient device connecting the distal ends of the first and second lever arms wherein the rearward ends of the first and second clamp elements are normally biased away from each other to the opened configuration.

8. A fifth wheel hitch apparatus as described in claim 7, further comprising:
   the locking mechanism including a second resilient device which normally biases the tumbler from the unlocked configuration to the locked configuration when the first and second clamp elements have assumed the closed configuration.

9. A fifth wheel hitch apparatus as described in claim 7, further comprising:
   a second resilient device structured and configured to normally transversely bias the tumbler from the unlocked configuration to the locked configuration;
   a handle connected to the tumbler, enabling a user to place the tumbler in the unlocked configuration; and
   a latch structured to releasably retain the tumbler in the unlocked configuration;
   wherein, when the locking mechanism is in the unlocked configuration, as the kingpin is being removed from the first and second clamp elements, the rearward end of the first clamp element bears against the distal end of the tumbler causing the latch to release retention of the tumbler such that the rearward end of the first clamp element retains the tumbler in the unlocked configuration instead of the latch.

10. A fifth wheel hitch apparatus as described in claim 6, wherein the mounting mechanism includes:
   (1) a generally horizontally-oriented plate portion having a rear edge;
   (2) a skirt portion extending rearwardly and downwardly from the rear edge of the plate portion; and (3) a centrally-spaced opening through the plate portion, the opening extending rearwardly to and through the skirt portion to provide ingress and egress access for the kingpin of the trailer.

11. A fifth wheel hitch apparatus for connecting a kingpin of a fifth wheel or gooseneck trailer to a towing vehicle, the fifth wheel hitch apparatus comprising:

(a) a mounting mechanism secured to the towing vehicle, the mounting mechanism including:
   (1) a generally horizontally-oriented plate portion having a rear edge,
   (2) a skirt portion extending rearwardly and downwardly from the rear edge of the plate portion,
   (3) a centrally-spaced opening through the plate portion, the opening extending rearwardly to and through the skirt portion to provide ingress and egress access for the kingpin of the trailer;

(b) a clamping mechanism including:
   (1) a first clamp element having a forward end, a rearward end, and a first lever arm spaced between the forward and rearward ends of the first clamp element, the first lever arm having a distal end, the first clamp element being spaced below and pivotally mounted to the plate portion about a first axle to pivot about a vertically-oriented first pivot axis,
   (2) a second clamp element having a forward end, a rearward end, and a second lever arm spaced between the forward and rearward ends of the second clamp element, the second lever arm having a distal end, the second clamp element being spaced below and pivotally mounted to the plate portion about a second axle to pivot about a vertically-oriented second pivot axis, the first and second clamp elements being structured and configured to be pivotally displaceable about the first and second pivot axes to cooperatively form an opened configuration wherein the rearward ends of the first and second clamp elements are spaced apart from each other in order to receive the kingpin of the fifth wheel or gooseneck trailer therebetween, and to cooperatively form a closed configuration wherein the kingpin is captured between the first and second clamp elements, and
   (3) a first resilient device connecting the distal ends of the first and second lever arms wherein the rearward ends of the first and second clamp elements are normally biased away from each other to the opened configuration; and (c) a locking mechanism including:
   (1) a tumbler having a shank with a distal end,
   (2) an unlocked configuration wherein the tumbler does not interfere with pivoting of the first and second clamp elements,
   (3) a locked configuration wherein the tumbler does prevent pivoting of the first and second clamp elements when the first and second clamp elements have assumed the closed configuration,
   (4) a second resilient device which normally and transversely biases the tumbler from the unlocked configuration to the locked configuration when the first and second clamp elements have assumed the closed configuration,
   (5) a handle connected to the tumbler enabling a user to selectively place the tumbler in the unlocked configuration, and
   (6) a latch structured to releasably retain the tumbler in the unlocked configuration;

(d) wherein, when the locking mechanism is in the unlocked configuration, as the kingpin is being removed from the first and second clamp elements, the rearward end of the first clamp element bears against the distal end of the tumbler, causing the latch to release retention of the tumbler such that the rearward end of the first clamp element retains the tumbler in the unlocked configuration instead of the latch; and (e) wherein as the trailer is being connected to the towing vehicle, the kingpin bears directly against the forward ends of the first and second clamp elements, the first and second clamp elements are positively and directly pivoted about the first and second pivot axes from the opened configuration to the closed configuration, and the second resilient device transversely biases the tumbler from the unlocked configuration to the locked configuration whereat the shank of the tumbler abuttingly engages the rearward ends of the first and second clamp elements thereby securely capturing and locking the kingpin between the first and second clamp elements in the closed configuration.

12. In a fifth wheel hitch for connecting a kingpin of a fifth wheel or gooseneck trailer to a towing vehicle wherein the fifth wheel hitch includes a pair of opposing jaws for capturing the kingpin of the trailer, the improvement comprising:

(a) one of the opposing jaws including a first clamp element including a forward end having a distal end with a peg, a rearward end, and a first lever arm spaced between the forward and rearward ends of the first clamp element and mounted about a first axle to pivot about a first pivot axis; and (b) the other one of the opposing jaws including a second clamp element having a forward end having a distal end with a slot structured and configured to slidably receive the peg of the forward end of the first clamp element therein, a rearward end, and a second lever arm spaced between the forward and rearward ends of the second clamp element and mounted about a second axle to pivot about a second pivot axis; wherein the first and second clamp elements also pivot relative to each other about a common third pivot axis;

(c) wherein as the trailer is being connected to the towing vehicle, the kingpin directly bears against the forward ends of the first and second clamp elements thereby positively and pivotally displacing the first and second clamp elements about the first, second and third pivot axes causing the kingpin to be captured between the first and second clamp elements.

13. A fifth wheel hitch apparatus for connecting a kingpin of a fifth wheel or gooseneck trailer to a towing vehicle, the fifth wheel hitch apparatus comprising:

(a) a mounting mechanism secured to the towing vehicle, the mounting mechanism including:
   (1) a generally horizontally-oriented plate portion having a rear edge,
   (2) a skirt portion extending rearwardly and downwardly from the rear edge of the plate portion, and
   (3) a centrally-spaced opening through the plate portion, the opening extending rearwardly to and through the skirt portion to provide ingress and egress access for the kingpin of the trailer;

(b) a clamping mechanism including:
   (1) a first clamp element including a forward end having a distal end with a peg, a rearward end, and a first lever arm spaced between the forward and rearward ends of the first clamp element, the first lever arm having a distal end, the first clamp element being spaced below and pivotally mounted to the plate portion about a first axle to pivot about a vertically-oriented first pivot axis, (2) a second clamp element including a forward end having a distal end with a slot, a rearward end, and a second lever arm spaced between the forward and rearward ends of the second clamp element, the second lever arm having a distal end, the second clamp element being spaced below and pivotally mounted to the plate portion about a second axle to pivot about a vertically-oriented second pivot axis, the slot being structured and configured to slidably receive the peg of the forward end of the first clamp element wherein the first and second clamp elements operatively pivot relative to each other about a common third pivot axis, the first and second clamp elements being structured and configured to be pivotally displaceable about the first, second and third pivot axes to cooperatively form an opened configuration wherein the rearward ends of the first and second clamp elements are spaced apart from each other in order to receive the kingpin of the fifth wheel or gooseneck trailer therebetween, and to cooperatively form a closed configuration wherein the kingpin is captured between the first and second clamp elements, and (3) a first resilient device connecting the distal ends of the first and second lever arms wherein the rearward ends of the first and second clamp elements are biased to the opened configuration; and (c) a locking mechanism including:

(1) a tumbler having a shank with a distal end, (2) an unlocked configuration wherein the tumbler does not interfere with pivoting of the first and second clamp elements, (3) a locked configuration wherein the tumbler does prevent pivoting of the first and second clamp elements when the first and second clamp elements have assumed the closed configuration, (4) a second resilient device which normally and transversely biases the tumbler from the unlocked configuration to the locked configuration when the first and second clamp elements have assumed the closed configuration, (5) a handle connected to the tumbler enabling a user to selectively place the tumbler in the unlocked configuration, and (6) a latch structured to releasably retain the tumbler in the unlocked configuration;

(d) wherein, when the locking mechanism is in the unlocked configuration, as the kingpin is being removed from the first and second clamp elements, the rearward end of the first clamp element bears against the distal end of the tumbler causing the latch to release retention of the tumbler such that the rearward end of the first clamp element retains the tumbler in the unlocked configuration instead of the latch; and (e) wherein as the kingpin bears directly against the forward ends of the first and second clamp elements, the first and second clamp elements are positively and directly pivoted about the first, second and third pivot axes from the opened configuration to the closed configuration, and the second resilient device biases the tumbler from the unlocked configuration to the locked configuration whereat the shank of the tumbler abuttingly engages the rearward ends of the first and second clamp elements thereby securely capturing and locking the kingpin between the first and second clamp elements in the closed configuration.

\* \* \* \* \*